(12) United States Patent
Salmon et al.

(10) Patent No.: US 10,838,454 B2
(45) Date of Patent: Nov. 17, 2020

(54) MONITOR MOUNTABLE STATUS LIGHT

(71) Applicant: Siemens Healthcare Diagnostics Inc., Tarrytown, NY (US)

(72) Inventors: Scott Salmon, Tenafly, NJ (US); Daniel LiCalzi, New York, NY (US); Daniel J. McDermott, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/319,275

(22) PCT Filed: Jul. 19, 2017

(86) PCT No.: PCT/US2017/042927
§ 371 (c)(1),
(2) Date: Jan. 18, 2019

(87) PCT Pub. No.: WO2018/017758
PCT Pub. Date: Jan. 25, 2018

(65) Prior Publication Data
US 2019/0286190 A1 Sep. 19, 2019

Related U.S. Application Data

(60) Provisional application No. 62/365,273, filed on Jul. 21, 2016.

(51) Int. Cl.
*G06F 1/16* (2006.01)
*G09G 5/00* (2006.01)
*G01N 35/00* (2006.01)

(52) U.S. Cl.
CPC ............. *G06F 1/1607* (2013.01); *G09G 5/00* (2013.01); *G01N 35/00871* (2013.01); *G09G 2380/08* (2013.01)

(58) Field of Classification Search
CPC .... G06F 1/1607; G09G 5/00; G09G 2380/08; G01N 35/00871
(Continued)

(56) References Cited

U.S. PATENT DOCUMENTS 5,769,374 A * 6/1998 Martin ................. G06F 1/1605
248/221.11
7,813,118 B2 * 10/2010 Burge .................. F16M 11/105
361/679.21
(Continued)

FOREIGN PATENT DOCUMENTS

JP 2002-102210 A 4/2002
JP 2003-260375 A 9/2003
(Continued)

OTHER PUBLICATIONS

Neo, High Throughput Full Automation, Immucor, Inc., rev. May 2014 (Year: 2014).*
(Continued)

*Primary Examiner* — Anatoly Vortman

(57) ABSTRACT

A monitor-mounted status indicator light assembly is disclosed, including at least one status indicator light and a mounting bracket adapted for mounting on a monitor. In some embodiments, standard VESA mounting configurations are employed, and the assembly's mounting bracket does not interfere with, or prevent, mounting of the monitor to a monitor mounting arm via the same VESA mounts.

16 Claims, 4 Drawing Sheets

(58) Field of Classification Search
USPC .......................................................... 361/600
See application file for complete search history.

(56) References Cited

U.S. PATENT DOCUMENTS

| | | | | |
|---|---|---|---|---|
| 7,823,856 | B2 * | 11/2010 | Schwartz | G06F 1/1611 248/442.2 |
| 7,918,427 | B2 * | 4/2011 | Wang | F16M 13/00 248/278.1 |
| 7,997,211 | B2 * | 8/2011 | Peterson | F16M 11/10 108/152 |
| 8,083,189 | B2 * | 12/2011 | Sun | F16M 11/08 248/122.1 |
| 8,240,628 | B2 * | 8/2012 | Huang | F16M 11/041 248/122.1 |
| 8,317,146 | B2 * | 11/2012 | Jung | G06F 1/1601 248/125.7 |
| 8,833,716 | B2 * | 9/2014 | Funk | F16M 13/02 248/316.4 |
| 9,163,779 | B2 * | 10/2015 | Funk | F16M 13/02 |
| 9,204,723 | B2 * | 12/2015 | Floersch | A47B 97/00 |
| 9,441,782 | B2 * | 9/2016 | Funk | F16M 13/02 |
| 2004/0223599 | A1 | 11/2004 | Bear et al. | |
| 2006/0027718 | A1 * | 2/2006 | Quijano | F16M 11/14 248/121 |
| 2007/0055116 | A1 | 3/2007 | Clark et al. | |
| 2007/0205340 | A1 * | 9/2007 | Jung | F16M 11/24 248/125.9 |
| 2009/0230263 | A1 * | 9/2009 | Burge | G06F 1/1605 248/220.1 |
| 2009/0257201 | A1 | 10/2009 | Burge | |
| 2010/0019699 | A1 | 1/2010 | McBride | |
| 2012/0025046 | A1 * | 2/2012 | Yen | F16M 11/045 248/298.1 |
| 2013/0092805 | A1 * | 4/2013 | Funk | F16M 13/02 248/121 |
| 2013/0277520 | A1 * | 10/2013 | Funk | F16M 13/02 248/274.1 |
| 2015/0289651 | A1 | 10/2015 | Floersch et al. | |
| 2015/0301559 | A1 * | 10/2015 | Wu | F16M 11/041 248/229.16 |
| 2019/0261525 | A1 * | 8/2019 | Chiu | H05K 5/0234 |

FOREIGN PATENT DOCUMENTS

| | | |
|---|---|---|
| JP | 2006-305614 A | 11/2006 |
| JP | 2008-098441 A | 4/2008 |
| JP | 2010-286379 A | 12/2010 |
| JP | 2011-228514 A | 11/2011 |
| JP | 2012-227407 A | 11/2012 |
| JP | 2013-222738 A | 10/2013 |
| JP | 2015-519955 A | 7/2015 |
| JP | 2015-169474 A | 9/2015 |
| WO | 2013/173520 A2 | 11/2013 |
| WO | 2014/068324 A1 | 5/2014 |

OTHER PUBLICATIONS

Extended EP Search Report dated Jun. 7, 2019 of corresponding European Application No. 17831824.2, 4 Pages.
PCT International Search Report and Written Opinion dated Sep. 29, 2017 (6 Pages).

* cited by examiner

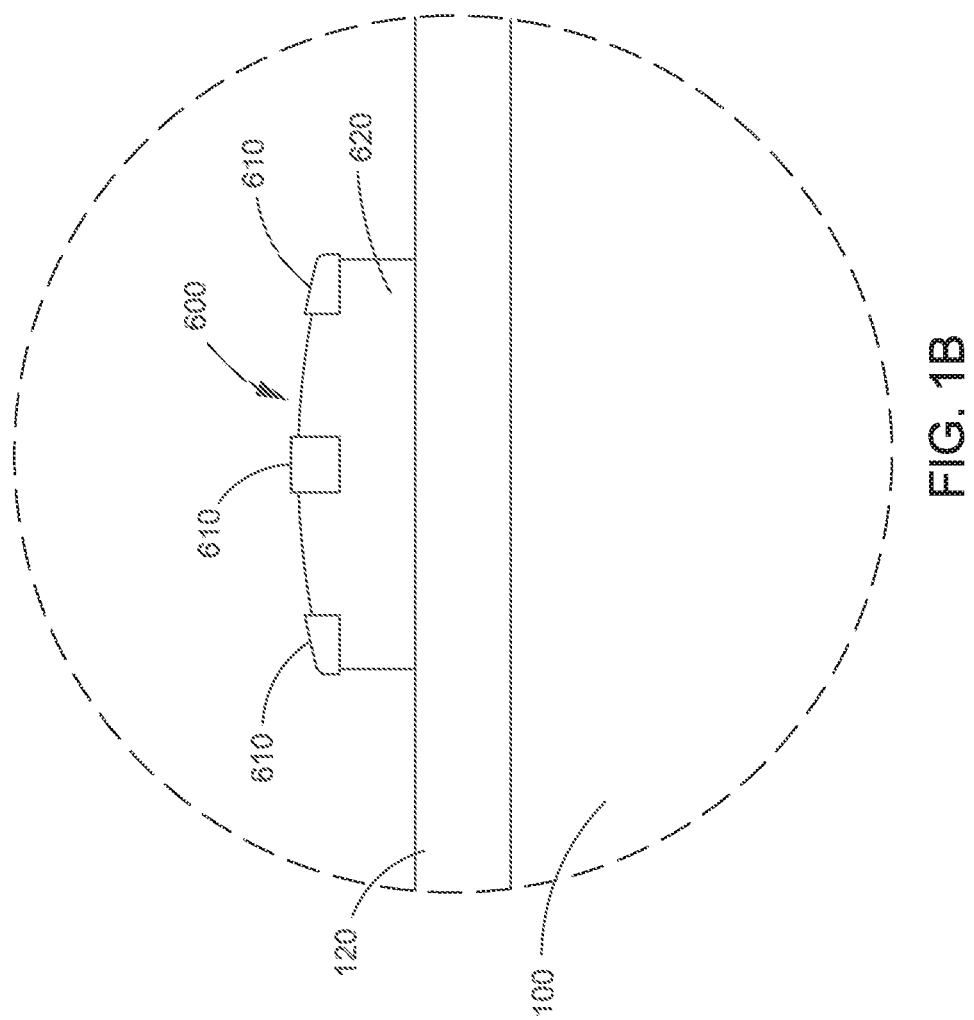

MONITOR MOUNTABLE STATUS LIGHT

CROSS-REFERENCE TO RELATED APPLICATIONS

This application claims the benefit of U.S. Provisional Application Ser. No. 62/365,273 filed Jul. 21, 2016, which is incorporated herein by reference in its entirety.

TECHNOLOGY FIELD

This disclosure relates in general to a visual instrument status indicator, particularly for use in a laboratory environment. This disclosure relates to a monitor-mounted visual instrument status indicator. More particularly, this disclosure relates to a visual instrument status indicator for use with an in vitro diagnostic system.

BACKGROUND

Many industrial, medical, laboratory, and other facilities employ a variety of instruments or machines individually, or as part of a system, for various purposes. Monitoring these instruments and systems is vital to productivity, maintenance, reduced downtime, and other factors. Many, if not all, of these instruments and systems employ a screen or monitor, often mounted on a support arm or other device. The description herein focuses on in vitro diagnostic instruments, but can be adapted for any system having a monitor.

In vitro diagnostics (IVD) allow labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes or vials containing patient samples, have been loaded. The analyzer extracts a liquid sample from sample vessels and combines the sample with various reagents in special reaction cuvettes or tubes (referred to, generally, as reaction vessels). In some conventional systems, a modular approach is used for analyzers. A lab automation system can shuttle samples between one sample processing module (module) and another module. Modules may include one or more stations, including sample handling stations and testing stations (e.g., a unit that can specialize in certain types of assays or can otherwise provide testing services to the larger analyzer, which may include immunoassay (IA) and clinical chemistry (CC) stations.

An automation system for use with analyzers in an IVD environment moves tubes containing sample specimens between different stations within an analyzer or between analyzers. One method of transporting sample and reagent tubes is on a carrier, or vessel mover (VM), moved about via a track system.

Thus, a typical IVD system includes multiple instruments, analyzers, automation systems, etc. The status of each of these, and/or the entire system, must be monitored to ensure proper functioning and maintenance. One way to facilitate monitoring is with status lights.

There are two general types of instrument status lights that are common in the industry. The first type is those that are integrated into the instrument covers. For example, the ADVIA Centaur® XP and XPT systems have LED arrays and lenses that are part of the outer plastic cover assemblies. These cannot be directly used on other instruments unless the mounting details are duplicated in the custom parts. That is, these are specific to a particular instrument in the IVD system, and are integrated into that particular instrument, typically for viewing in close proximity to that instrument. The second type typically takes the form of a light pole. These, typically, are not tailored for specific instruments, and are more generic. Light poles require mounting features on the instruments, and they are more costly.

Thus, there is a need in the industry for status light indicators that are readily visible, can be adapted to monitor an entire system and/or a part thereof, require little, if any, special mounting hardware, and other features.

SUMMARY

Some embodiments provide a status indicator light assembly comprising a status indicator light housing, including at least one indicator light; and a status indicator light mounting bracket connected to the status indicator light housing and adapted for mounting to a at least one of a monitor, monitor support element, monitor arm, or monitor mounting bracket.

In some embodiments, the status indicator light mounting bracket has one or more mounting holes arranged in a standardized mounting configuration.

In some embodiments, the standardized mounting configuration is a VESA compliant configuration.

In some embodiments, the indicator light housing and the status indicator light mounting bracket are interconnected by a housing support.

In some embodiments, the housing support is hollow to facilitate cable management.

In some embodiments, the housing support is adjustable in length to facilitate use on different sized monitors.

In some embodiments, the assembly is further provided with an accessory bracket support arm.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 1B depicts a close-up view of the encircled area of the monitor-mounted status light assembly of FIG. 1A of, in accordance with an embodiment described herein.

DETAILED DESCRIPTION

Figure 1A:
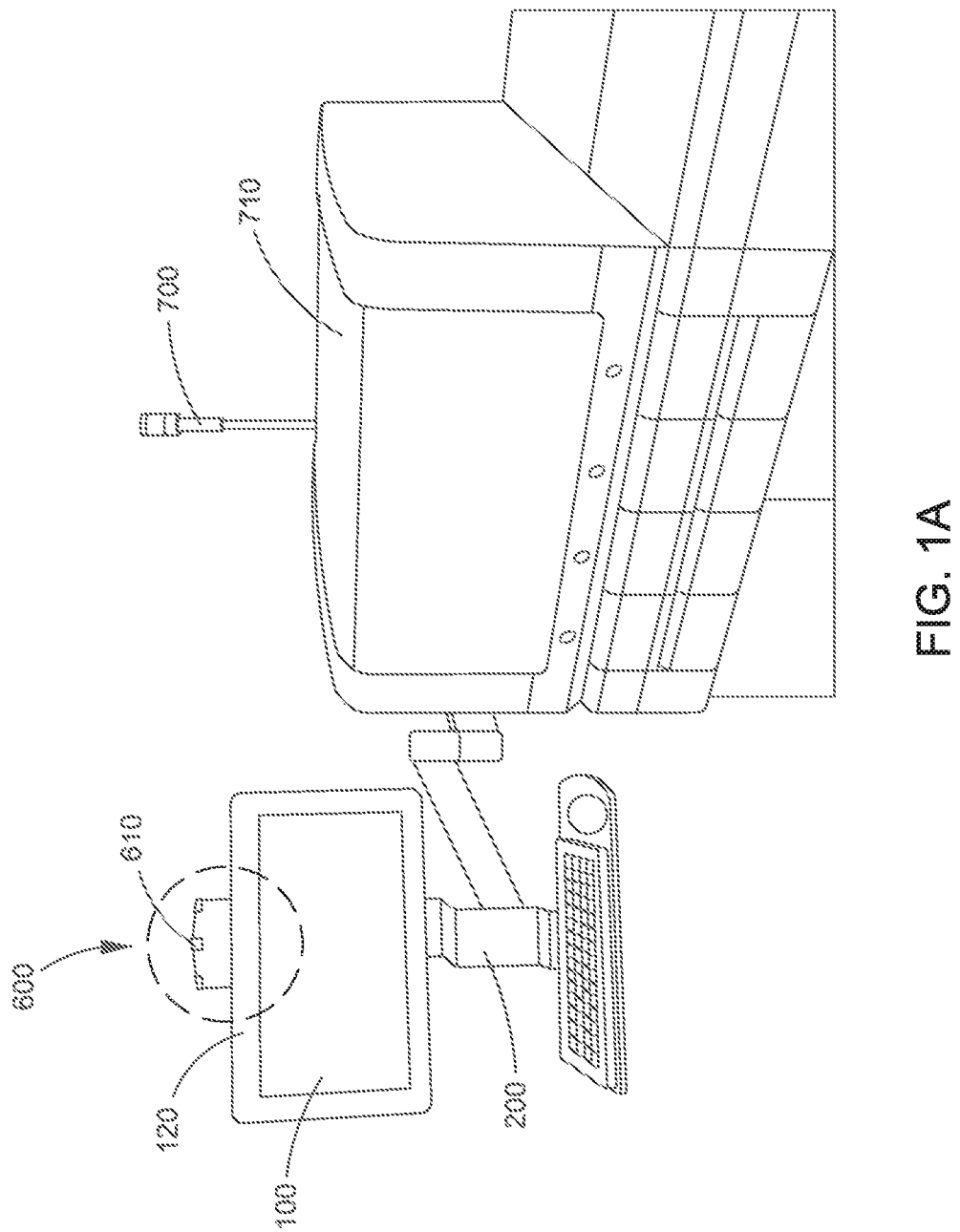
FIG. 1A depicts an environmental view of a monitor-mounted status light assembly.

The monitor-mounted status light assembly disclosed herein addresses several problems. One significant problem addressed is the need to have a visual instrument status indicator that can be applied to several instruments, without requiring those instruments to have special hardware provisions.

The status light(s), itself, is in communication with the system that it monitors. This communication could be wired or wireless. The status lights can be in communication with an individual system component, or multiple individual components, or with a computer monitoring the overall system or part thereof. Any suitable monitoring arrangement may be used, with the indicator light being an indicator to allow the user to know, at a glance, if the system needs attention. In some embodiments, the status light could include additional or more detailed information.

Most large instruments in the industry use one or more stock monitors to accommodate user interaction with the system. Mounting a status light at the monitor has several benefits, including drawing the user's attention to the monitor, which is the first place a user would normally go to get more information about a potential problem and how to address it. The monitor-mounted status light assembly may also provide additional features, such as, but not limited to, USB ports for a keyboard and mouse, which reduces the number of cables that must be routed through the housing support, a connector for an additional accessory light pole for customers who may want a more conventional light pole, additional sensors, such as temperature and humidity sensors to help instruments monitor the use environment, providing a mounting bracket for a hand bar-code scanner, etc. Other sensors may be applicable with other instruments or environments, including but not limited to altitude sensors, particulate sensors, ambient light sensors, contaminant sensors, and other sensors that could detect conditions that impact proper function where the system could make compensations to adjust for the sensed conditions and/or alert the operator.

Mounting a status light at the monitor provides a low-cost, flexible alternative to integrated status lights, and OEM status lights.

Most monitors provide a standard mounting hole pattern (VESA) for connection to bracketry, monitor support arms, etc. Referring to the figures, the monitor-mounted status light assembly is provided with a mounting bracket 500 that matches a standard VESA hole pattern. The mounting bracket 500 is thin enough to fit between the VESA mount surface 110 on the monitor 100, and the monitor support arm 200, so that it can be securely mounted without additional screws. Because it is standardized, it can be mounted to any system that uses a VESA compatible monitor. Current standards are VESA, but the monitor-mounted status light assembly could be adapted for any existing or future mounting system whether standard, proprietary, or otherwise.

By taking advantage of standard mounting arrangements and the use of the same or similarly dimensioned monitors, the same status light can be used on multiple instruments, without the need for special mounting hardware. In some embodiments, status light could be mounted to at least one of a monitor, monitor support element, monitor arm, or monitor mounting bracket.

The status light 600 itself can be provided with any of a variety of status lights 610 or signals from simple red/yellow/green indicator lights to a more complex system of lights corresponding to various instruments and/or conditions. In some embodiments, the status light itself could be an additional monitor (not shown) for providing status indications. The more severe the problem, the more prominent the visual signal is. Red is the highest alert state, so all three elements could be illuminated; green is the lowest, so only the center element could be illuminated. In some embodiments, the visual cues have been expanded to help with recognition of the different alert colors. This is especially helpful for people with color blindness. For example, light position, color, and/or number of light elements illuminated can be used to differentiate between different alert states.

In some embodiments, the status light housing 620 is adapted and configured to ensure that the minimum number of elements (lights) 610 necessary to convey alert status are visible from any position around the instrument. In some embodiments, the status light housing 620 is curved to facilitate this visibility.

The status light housing 620 and bracketry can be adapted to provide additional functions such as: connections for other hardware (USB ports for monitor, keyboard, and additional light pole), cable storage area, scanner mounting bracket, temperature and humidity sensors, etc.

FIG. 1A depicts an exemplary monitor-mounted status indicator light assembly described herein. FIG. 1B is a close-up of the encircled portion of FIG. 1A. In the embodiment shown in FIGS. 1A and 1B, the status light 600 is a simple red/yellow/green, three-light system. The status light 600 comprises a light housing 620, in which the three lights 610 are located for ease of viewing. As depicted, the status light housing 620 is mounted centrally above the upper bezel 120 of a monitor 100. The upper edge of the status light housing 620 is curved to facilitate viewing of all three lights 610 from any position, in front of, behind, or to the side of, the instrument or monitor. A more traditional light pole 700 can also be seen behind the instrument 710.

Figure 2:
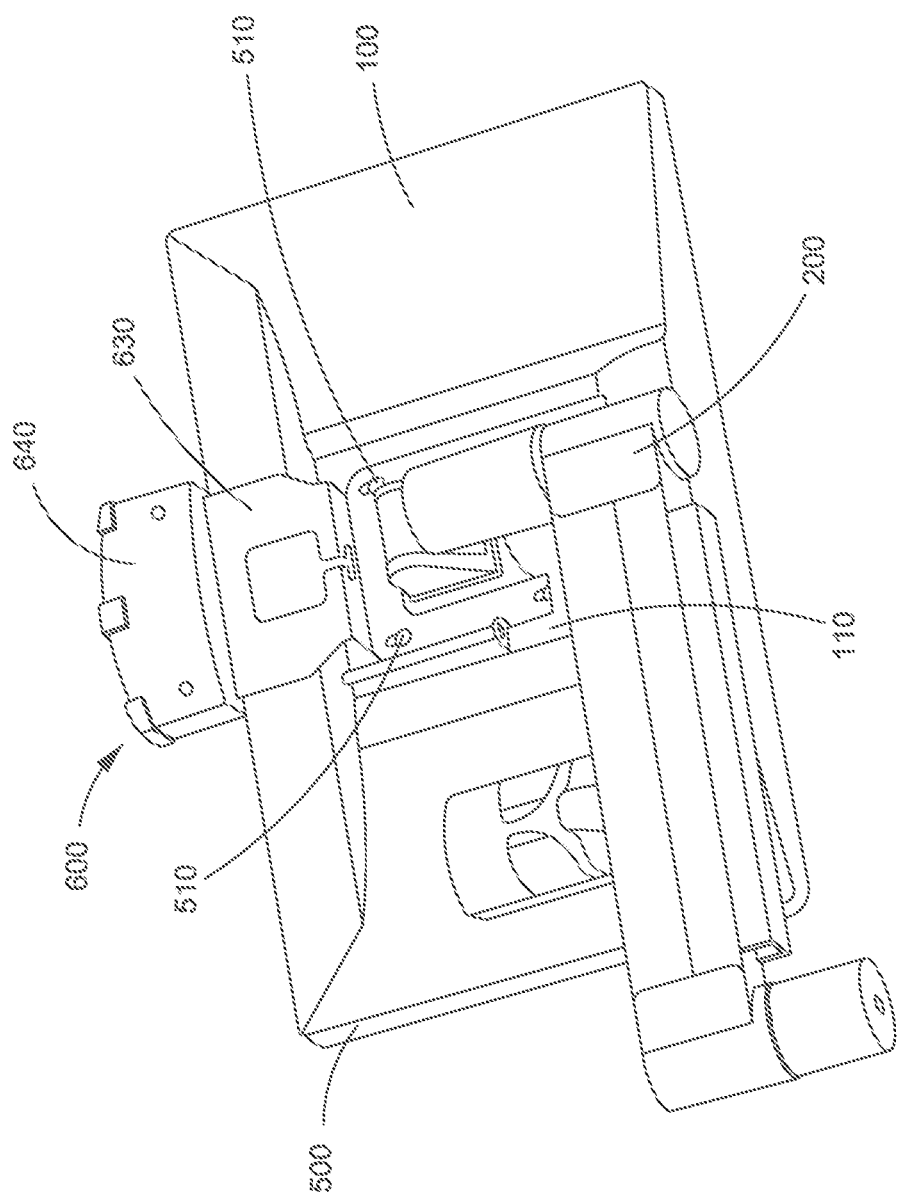
FIG. 2 depicts a rear view of a monitor-mounted status light assembly in accordance with an embodiment described herein.
Figure 3:
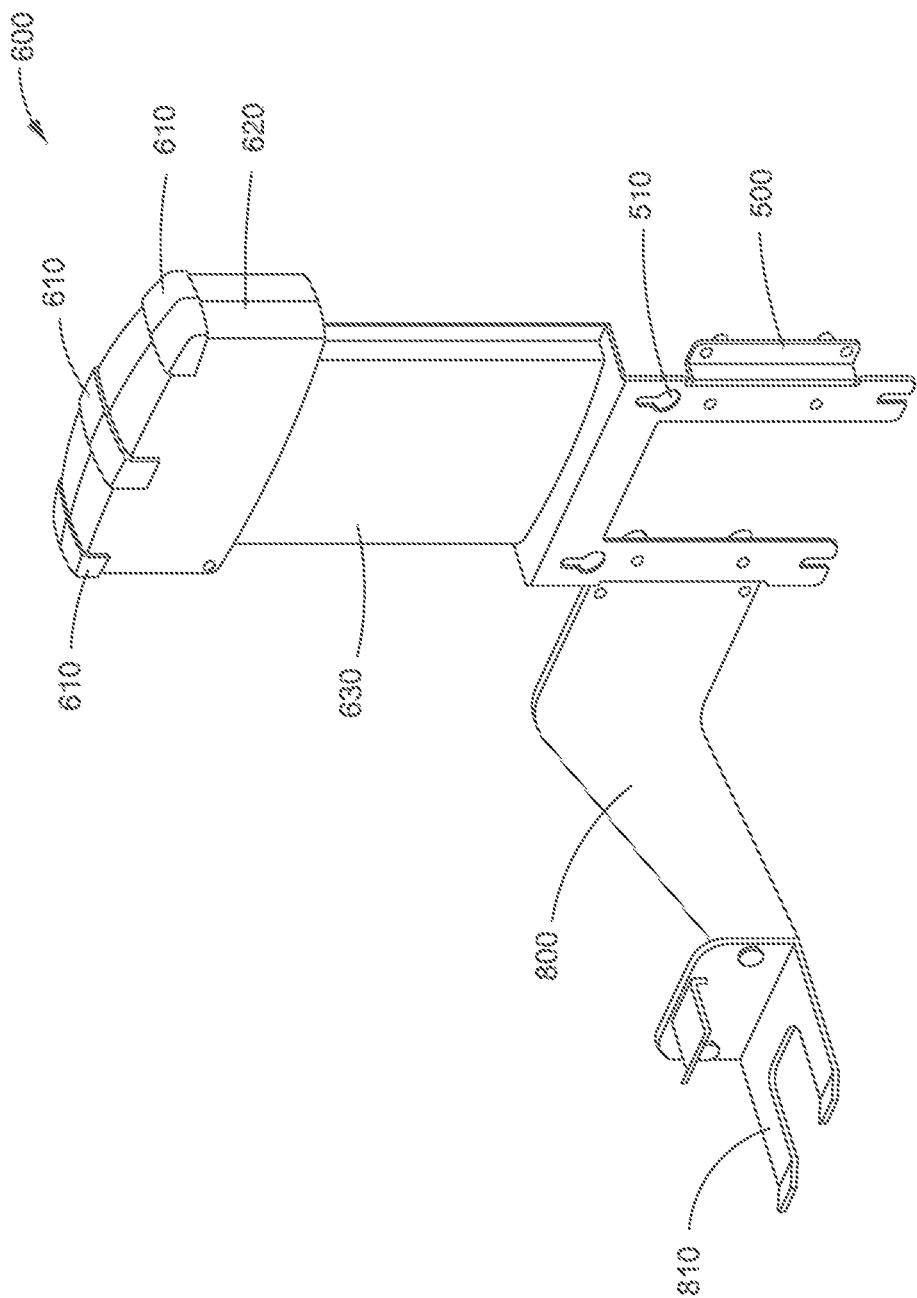
FIG. 3 depicts a monitor-mounted status light assembly and mounting bracket in accordance with an embodiment described herein.

FIG. 2 shows a schematic view of the monitor-mounted status light assembly shown in FIG. 1. As depicted, this embodiment also includes optional temperature and humidity sensors 640, which may be linked to the status lights 610, or to a remote computer (not shown) for assessing overall conditions of the system and environment. Optional mounting ports, USB hubs, and cable management features are also shown. A housing support 630 connects the status light housing to a mounting bracket. Standardized VESA mounting configurations are used to facilitate connection to standard monitors. As noted above, the mounting bracket 500 for the status light 600 is strong enough to support the status light, but thin enough that it does not interfere with the mounting of the monitor to a monitor support arm. In some instances, the mounting bracket 500 is thin enough that the original mounting screws may still be used. In other embodiments, slightly longer screws may be needed. FIG. 3 depicts an alternative monitor-mounted status light assembly and mounting bracket with optional features, such as accessory bracket supports 800 and an accessory holder 810. These can be customized, depending upon the particular accessory. For example, this could be customized for holding a bar code scanner. The housing support 630 may be hollow to allow cables to pass therethrough from the status light housing 620 to the system being monitored or a computer. The housing support 630 may also be adjustable to accommodate various distances between the VESA mounting holes 510 and edge of the monitor.

Although the embodiments depicted show the status light at the top of the monitor, it is contemplated that, in some embodiments, the status light could be more appropriately placed at either side of the monitor, or even at the bottom. That is, the mounting plate, housing support, and status light housing can be arranged and configured to position the status light in any position along the periphery of the monitor to ensure the best viewing angles possible. In some embodiments, the mounting plate, housing support, and/or status light housing may be articulated or adjustable to facilitate various monitor sizes and/or placement about the periphery of the monitor.

The above-described embodiments exploit the standard VESA mounting features on existing monitors to provide an inexpensive, secure mounting location. However, the benefits are not entirely dependent on this mounting method. Similar benefits could be realized with a design that clips to the monitor, or simply rests somewhere on the instrument.

The value of this solution is that it provides a status light that does not depend on special mounting features on the instrument, and it provides additional functions that help reduce hardware complexity, save cost, and can be easily implemented on other instruments, or changed/updated without requiring changes to instrument hardware.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations that fall within the true spirit and scope of the invention.

We claim:

1. An in vitro diagnostic system comprising:
a diagnostic instrument configured to produce a status;
a monitor electronically connected to the diagnostic instrument; and
a status indicator light assembly electronically connected to the diagnostic instrument and mechanically attached to the monitor, the status indicator light assembly comprising:
a curved status indicator light housing comprising a plurality of indicator lights configured to indicate the status of the diagnostic instrument, wherein the plurality of indicator lights are positioned on an upper surface of the status indicator light housing; and
a status indicator light mounting bracket connected to the curved status indicator light housing and adapted for mounting to at least one of the monitor, a monitor support element for the monitor, a monitor arm of the monitor, or a monitor mounting bracket of the monitor.

2. The in vitro diagnostic system of claim 1, wherein the status indicator light mounting bracket has one or more mounting holes arranged in a standardized mounting configuration.

3. The in vitro diagnostic system of claim 1, wherein the indicator light housing and the status indicator light mounting bracket are interconnected by a housing support attached to a downward facing side of the indicator light housing.

4. The in vitro diagnostic system of claim 3, wherein the housing support is hollow to facilitate cable management.

5. The in vitro diagnostic system of claim 3, wherein the housing support is adjustable in length to facilitate use on different sized monitors.

6. The in vitro diagnostic system of claim 1, wherein the assembly is further provided with an accessory bracket support arm.

7. The in vitro diagnostic system of claim 1, wherein the status indicator light assembly further comprises at least one sensor.

8. The in vitro diagnostic system of claim 7, wherein the at least one sensor comprises one or more of a temperature or humidity sensor.

9. The in vitro diagnostic system of claim 7, wherein the at least one sensor is linked to at least one of the plurality of indicator lights.

10. The in vitro diagnostic system of claim 1, further comprising at least one additional status indicator light on the diagnostic instrument.

11. The in vitro diagnostic system of claim 1, wherein the plurality of indicator lights comprise two indicator lights positioned at corners of the upper surface of the status indicator light assembly and a third indicator light positioned midway between the two indicator lights.

12. The in vitro diagnostic system of claim 11, wherein the plurality of indicator lights display one of a plurality of colors indicative of an alert state associated with the diagnostic instrument.

13. The in vitro diagnostic system of claim 11, wherein (a) during a high alert state each of the plurality of indicator lights is illuminated and (b) during a low alert state, only the third indicator light is illuminated.

14. A status indicator light assembly configured to be electronically connected to a diagnostic instrument of an in vitro diagnostic system and mechanically attached to a monitor, the status indicator light assembly comprising:
a communication element for the electronic connection to the diagnostic instrument, wherein the communication element is configured to receive a status of the diagnostic instrument;
a curved status indicator light housing comprising a plurality of indicator lights configured to indicate the status of the diagnostic instrument, wherein the plurality of indicator lights are positioned on an upper surface of the status indicator light housing; and
a status indicator light mounting bracket connected to the curved status indicator light housing and adapted for mounting to at least one of the monitor, a monitor support element for the monitor, a monitor arm of the monitor, or a monitor mounting bracket of the monitor.

15. The status indicator light assembly of claim 14, wherein the communication element comprises a wired connection.

16. The status indicator light assembly of claim 14, wherein the communication element comprises a wireless connection.

* * * * *